United States Patent
Kurozasa (10) Patent No.: US 8,345,276 B2
(45) Date of Patent: Jan. 1, 2013

(54) PRINTING PRIORITY JOBS WHEN SHEET COUNT IS LIMITED

(75) Inventor: Yoshiharu Kurozasa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 903 days.

(21) Appl. No.: 11/903,220

(22) Filed: Sep. 21, 2007

(65) Prior Publication Data

US 2008/0186530 A1  Aug. 7, 2008

(30) Foreign Application Priority Data

Sep. 22, 2006  (JP) ................. 2006-257389

(51) Int. Cl.
*G06K 15/00*  (2006.01)
(52) U.S. Cl. .................................... 358/1.14
(58) Field of Classification Search ............. 358/1.15, 358/1.14
See application file for complete search history.

(56) References Cited

U.S. PATENT DOCUMENTS

| | | | |
|---|---|---|---|
| 6,202,092 B1 | 3/2001 | Takimoto | |
| 6,597,469 B1* | 7/2003 | Kuroyanagi | 358/1.15 |
| 6,738,587 B1* | 5/2004 | Hoene et al. | 399/77 |
| 7,394,558 B2* | 7/2008 | Stringham | 358/1.15 |
| 2005/0219640 A1* | 10/2005 | Kasatani | 358/402 |
| 2005/0275868 A1 | 12/2005 | Higashiura et al. | |
| 2007/0127058 A1* | 6/2007 | Eldridge | 358/1.15 |

FOREIGN PATENT DOCUMENTS

| | | |
|---|---|---|
| JP | 10-161823 | 6/1998 |
| JP | 2002-108587 | * 4/2002 |
| JP | 2002-215373 | 8/2002 |
| JP | 2003-274065 | 9/2003 |
| JP | 2005-031328 | 2/2005 |
| JP | 2005-100111 | 4/2005 |
| JP | 2005-111707 | 4/2005 |
| JP | 2005-157803 | 6/2005 |
| JP | 2005-349704 | 12/2005 |
| JP | 2006-159679 | 6/2006 |

* cited by examiner

*Primary Examiner* — Benny Q Tieu
*Assistant Examiner* — Eric A Rust
(74) *Attorney, Agent, or Firm* — Edwards Wildman Palmer LLP; David G. Conlin; Steven M. Jensen (57) ABSTRACT

A printing system and a printing method are provided that automatically determine a preferentially executed print job to perform printing when a requested number of prints exceeds an upper limit value of permitted number of prints. The printing system and method include a user terminal, a print apparatus, a manager terminal, and a management server connected to a network, and an upper limit value of permitted number of prints is set thereon for each user. The printing management server includes a print number calculating portion that calculates the printable number of sheets from the remainder of the permitted number of prints of a user and the number of prints necessary for a plurality of print job requests from the user, and a print job determining portion that automatically determines a prioritized print job if the printable number of sheets is insufficient.

6 Claims, 8 Drawing Sheets

| ACCOUNT INFORMATION | E-MAIL ADDRESS | UPPER LIMIT VALUE OF PERMITTED NUMBER OF PRINTS | NUMBER OF PROCESSED PRINTS | REMAINING PRINTABLE NUMBER OF SHEETS |
|---|---|---|---|---|
| USER A | A @ b.co.jp | 1000 | 900 | 100 |
| USER B | B @ b.co.jp | 1500 | 150 | 1350 |
| USER C | C @ b.co.jp | 1500 | 1300 | 200 |
| GROUP A | GA @ b.co.jp | 3000 | 1400 | 1600 |
| GROUP B | GB @ b.co.jp | 5000 | 2000 | 3000 |

| ACCOUNT INFORMATION | E-MAIL ADDRESS | UPPER LIMIT VALUE OF PERMITTED NUMBER OF PRINTS | NUMBER OF PROCESSED PRINTS | REMAINING PRINTABLE NUMBER OF SHEETS |
|---|---|---|---|---|
| USER A | A @ b.co.jp | 1000 | 900 | 100 |
| USER B | B @ b.co.jp | 1500 | 150 | 1350 |
| USER C | C @ b.co.jp | 1500 | 1300 | 200 |
| GROUP A | GA @ b.co.jp | 3000 | 1400 | 1600 |
| GROUP B | GB @ b.co.jp | 5000 | 2000 | 3000 |

FIG. 6

| MACHINE INFORMATION | PRINT SPEED | IMAGE QUALITY | PRIORITY |
|---|---|---|---|
| PRINT APPARATUS (a) | COLOR: 60 SHEETS/MIN MONOCHROME: 80 SHEETS/MIN | 600 × 600dpi | 1 |
| PRINT APPARATUS (b) | COLOR: 30 SHEETS/MIN MONOCHROME: 40 SHEETS/MIN | 300 × 300dpi | 2 |
| PRINT APPARATUS (c) | MONOCHROME: 30 SHEETS/MIN | 200 × 200dpi | 3 |

PRINT JOB MANAGEMENT TABLE

| | PRINT APPARATUS | NUMBER OF SHEETS | COLOR/ MONOCHROME | IMAGE QUALITY | |
|---|---|---|---|---|---|
| 1 | (a) | 50 | COLOR | 600dpi | IN PROCESS |
| 2 | (b) | 200 | MONOCHROME | 300dpi | WAITING |
| 3 | (a) | 200 | COLOR | 600dpi | WAITING |
| 4 | | | | | |
| 5 | | | | | |

(B)

PRINT JOB MANAGEMENT TABLE

| | PRINT APPARATUS | NUMBER OF SHEETS | COLOR/ MONOCHROME | IMAGE QUALITY | |
|---|---|---|---|---|---|
| 1 | (a) | 200 | COLOR | 600dpi | IN PROCESS |
| 2 | (b) | 200 | MONOCHROME | 300dpi | WAITING |
| 3 | | | | | |
| 4 | | | | | |
| 5 | | | | | |

PRINTING PRIORITY JOBS WHEN SHEET COUNT IS LIMITED

CROSS-NOTING PARAGRAPH

This Nonprovisional application claims priority under 35 U.S.C. §119 (a) on Patent Applications No. 2006-257389 filed in JAPAN on Sep. 22, 2006, the entire contents of which are hereby incorporated herein by references.

FIELD OF THE INVENTION

The present invention relates to a printing system and printing method including a user terminal, a print apparatus, and a management server connected over a network.

BACKGROUND OF THE INVENTION

Recently, reduction of setup costs of print apparatuses is achieved by utilizing a print apparatus connected to a network among a plurality of users and office work is made more efficient by reducing printing time with distributed printing and simultaneous printing with the use of a plurality of print apparatuses. On the other hand, color printers become widely utilized partially because of performance improvement thereof, while the numbers of sheets used for printing and copying are increased and printing costs are also increased. Therefore, in Japanese Laid-Open Patent Publication No. 2002-215373, a management server is connected to a network to manage both printing and copying, and the permitted number of prints for a user is limited by centrally manage printing limiting information, etc., to give instructions on whether printing can be performed, etc.

In Japanese Laid-Open Patent Publication No. 2005-349704, an upper limit value of permitted number of prints is set for each user to predict necessity of alteration in setting of the upper limit value of permitted number of prints from the permitted number of prints set for a user and the situation of the number of prints, and a setting alteration inquiring portion is included for inquiring of a manager whether alteration in setting of the upper limit value of permitted number of prints is granted or not. When alteration in setting of the upper limit value of permitted number of prints is granted by the manager, a print process is enabled based on the altered print limitation.

When an upper limit value of permitted number of prints is set for each user or a group consisting of a plurality of users, a requested number of prints may exceed the upper limit value of permitted number of prints due to generation of sudden events, responses to customers, etc. Although a user normally requests a manager who manages setting of the permitted number of prints to alter the upper limit value of permitted number of prints in such a case, as shown in Japanese Laid-Open Patent Publication No. 2005-349704, a response may not quickly be made to a sudden alteration request in many cases due to absence of the manager, etc. In such a case, accommodation must be made within a range of the printing limitation so as to avoid interruption or stagnation of the print process.

SUMMARY OF THE INVENTION

It is the object of the present invention to provide a printing system and printing method that automatically determines a preferentially executed print job to perform printing when the requested number of prints exceeds an upper limit value of permitted number of prints.

The printing system and method according to the present invention includes a user terminal, a print apparatus, and a printing management server connected to a network, the printing system and method having set thereon an upper limit value of permitted number of prints for each user, the printing management server including a print number calculating portion that calculates the printable number of sheets from the remainder of the permitted number of prints of a user and the number of prints necessary for a plurality of print job requests from the user, and a print job determining portion that automatically determines a prioritized print job if the printable number of sheets is insufficient.

A print job with a higher function is prioritized such that, for example, if the plurality of print jobs is a color printing job and a monochrome printing job, the color printing job is prioritized; in the case of a high-speed printing job and a normal-speed printing job, the high-speed printing job is prioritized; and in the case of a high-quality printing job and a normal-quality printing job, the high-quality printing job is prioritized. Confirmation of the determination result of a prioritized print determining portion may be acquired from the user by a print job confirming portion.

PREFERRED EMBODIMENTS OF THE INVENTION

Figure 1:
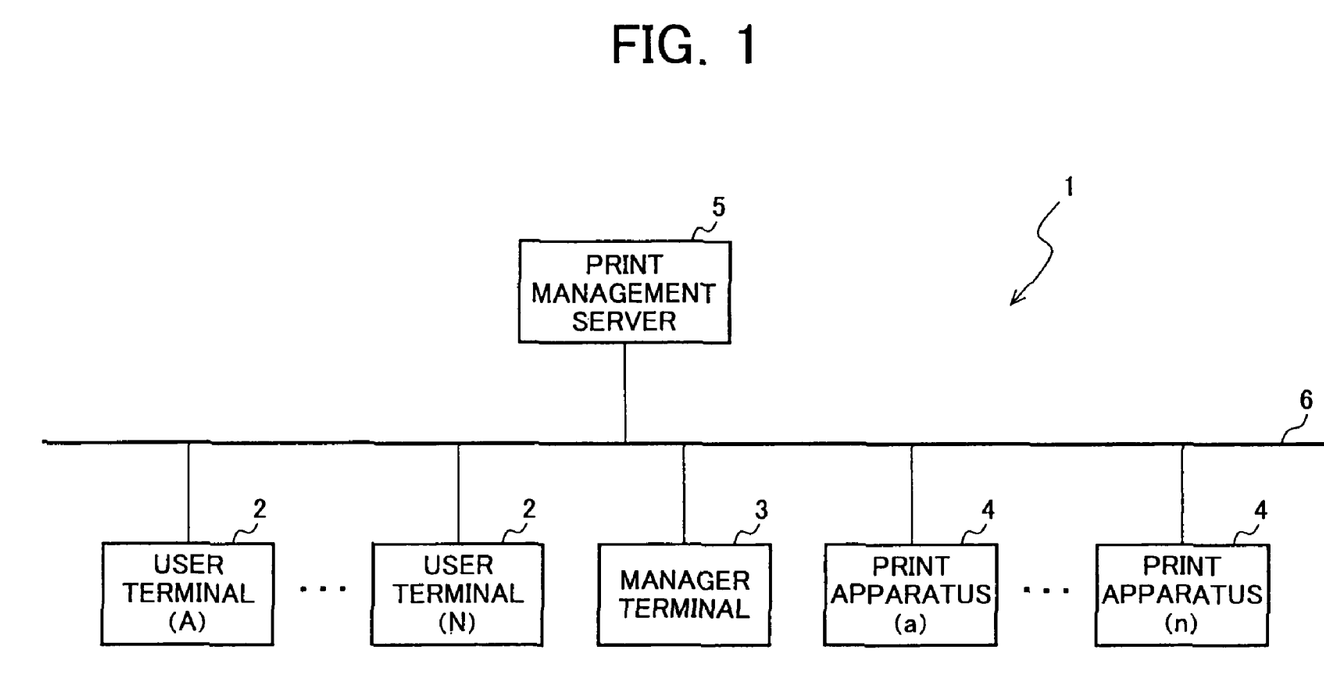
FIG. 1 is an explanatory view of an outline of a printing system of the present invention.

Embodiments of the present invention will now be described with reference to the accompanying drawings. FIG. 1 is an explanatory view of an outline of a printing system of the present invention. In FIG. 1, a reference numeral 1 indicates a printing system; 2 indicates a user terminal; 3 indicates a manager terminal; 4 indicates a print apparatus; 5 indicates a printing management server; and 6 indicates a communication network.

As shown in FIG. 1, the printing system 1 according to the present invention is configured by connecting a plurality of the user terminals 2, the manager terminal 3, a plurality of the print apparatuses 4, and the printing management server 5 in communication with each other through the communication network 6, for example.

The user terminal 2 is a terminal operated by a user and creates data for printing such as input of image data, distinction between color printing and monochrome printing, setting of print sheets, number of prints, necessity of application of management images, etc. The header information of the print data is supplied through the print apparatus 4 to the printing management server 5 or supplied directly to the printing management server 5. A plurality of users may use one user terminal.

The manager terminal 3 is a terminal similar to the user terminal 2 and is differentiated from other user terminals as a terminal operated by a person performing management of print processes such as allocating upper limit values of permitted number of prints to each user through the terminal. Although one manager terminal 3 is sufficient, a plurality of the terminals may have different management contents to perform operations in a distributed manner.

For the print apparatuses 4, a plurality of image forming apparatuses is used in various forms such as digital multi-function peripherals and printers. Print apparatuses including particular functions can also be used such as print apparatuses for color printing, monochrome printing, high image quality, or high-speed printing. One print apparatus may include a plurality of the particular functions to select and use such functions.

The printing management server 5 manages an upper limit value of permitted number of prints for each user or group, determines whether a print process can be executed, and manages the number of prints in the printing system of the present invention. The printing management server 5 may also monitor printing statuses of the print apparatuses to perform management operations at the same time such that the users can execute print jobs in an appropriate printing schedule.

The user terminal 2, the manager terminal 3, the print apparatus 4, and the printing management server 5 can communicate with each other through the communication network 6. Upper limit values of the permitted numbers of sheets used for printing and copying (hereinafter, collectively referred to as permitted numbers of prints) are supplied from the manager terminal 3 through the user terminals 2 to the users. The permitted numbers of prints are also supplied to the printing management server 5, and the permitted numbers of prints are set in a print management table. The permitted numbers of prints are set in amounts of money such as budgets by converting the numbers of sheets into amounts of money.

An upper limit value of permitted number of prints can be set for each individual, each business group, or each office unit (hereinafter, collectively and simply referred to as a user). An upper limit value of permitted number of prints means the number of sheets printable within a predetermined period and can be set on a yearly or half-yearly basis, on a monthly basis, on a weekly basis, and on a daily basis, for example.

The manager of the manager terminal 3 is a person having authorization to set the upper limit values of permitted numbers of prints for the users or to approve alteration of the setting. For example, the manager corresponds to a person in an administrative position in a company organization or a management representative delegated to manage office supplies.

Figure 2:
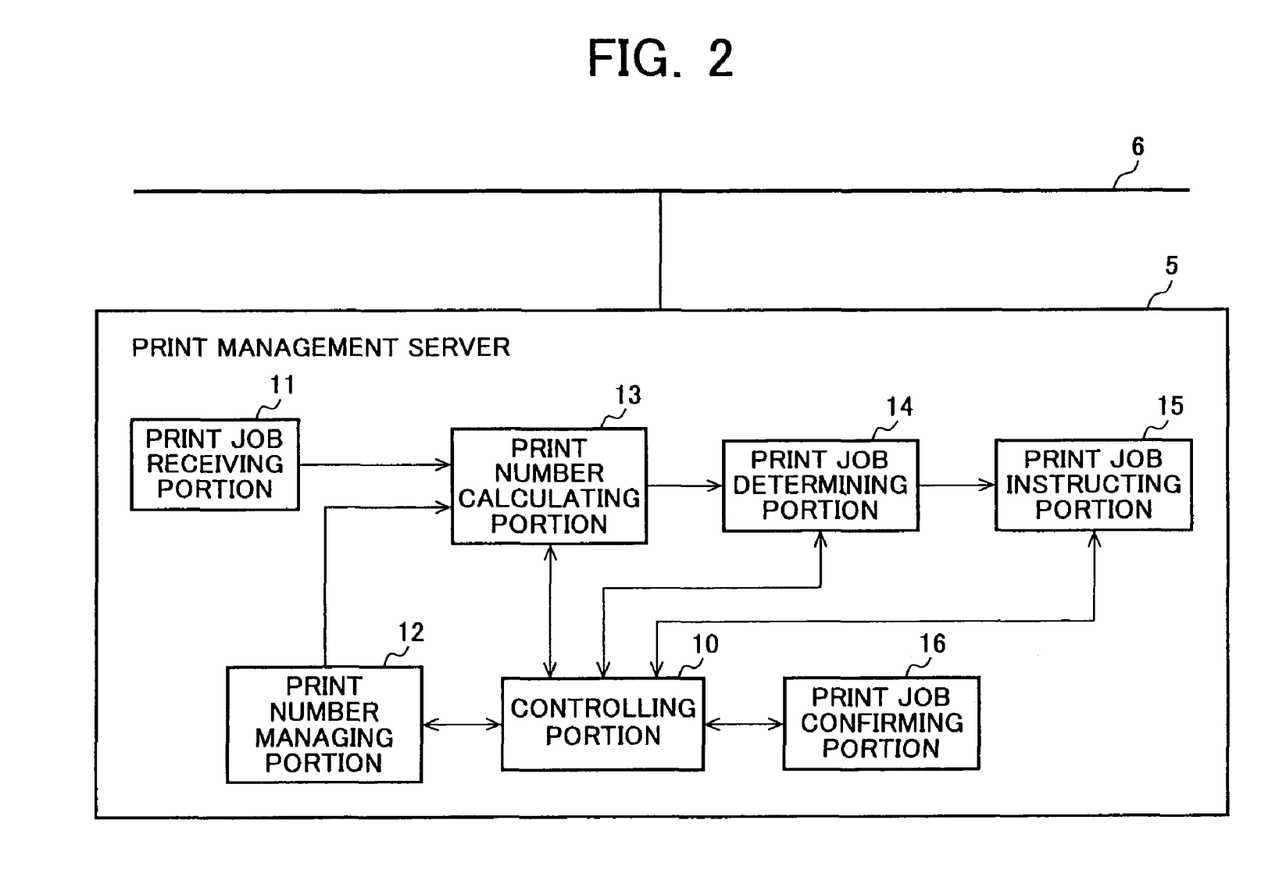
FIG. 2 is an explanatory view of an example of a printing management server of the present invention.

FIG. 2 is an explanatory view of an example of a printing management server, and in FIG. 2, a reference numeral 10 indicates a controlling portion; 11 indicates a print job receiving portion; 12 indicates a print number managing portion; 13 indicates a print number calculating portion; 14 indicates a print job determining portion; 15 indicates a print job instructing portion; and 16 indicates a print job confirming portion.

As shown, an outline configuration of the printing management server 5 includes: the print job receiving portion 11 that accepts inquiries for execution of print jobs from the print apparatuses 4; the print number managing portion 12 that manages the permitted number of prints and the remaining number of prints for each user; the print number calculating portion 13 that calculates the printable number of sheets for a print job of a user; the print job determining portion 14 that determines whether a requested print job can be executed; the print job instructing portion 15 that instructs the print apparatuses to execute printing; the print job confirming portion 16 that confirms priorities of print jobs; and the controlling portion 10 that controls these portions.

The controlling portion 10 controls general management functions for printing and includes a CPU and a program for controlling communications with external terminals and the print apparatuses. The print job receiving portion 11 receives a multiplicity of print jobs including print reservations through the print apparatus 4 from a plurality of user terminals connected to the communication network 6 to manage execution, queuing, etc., of the print jobs in a job management table. Since the header information attached to the print job presents distinction between color and monochrome, a size of print sheets, the number of prints, etc., a determination can be made on whether the print job can be executed and on the printable number of sheets.

The print number managing portion 12 stores a print number management table including the upper limit value of permitted number of prints for each user transmitted from the manager terminal 3, the number of used print sheets, the remaining printable number of sheets calculated from a difference of the numbers.

Figure 5:
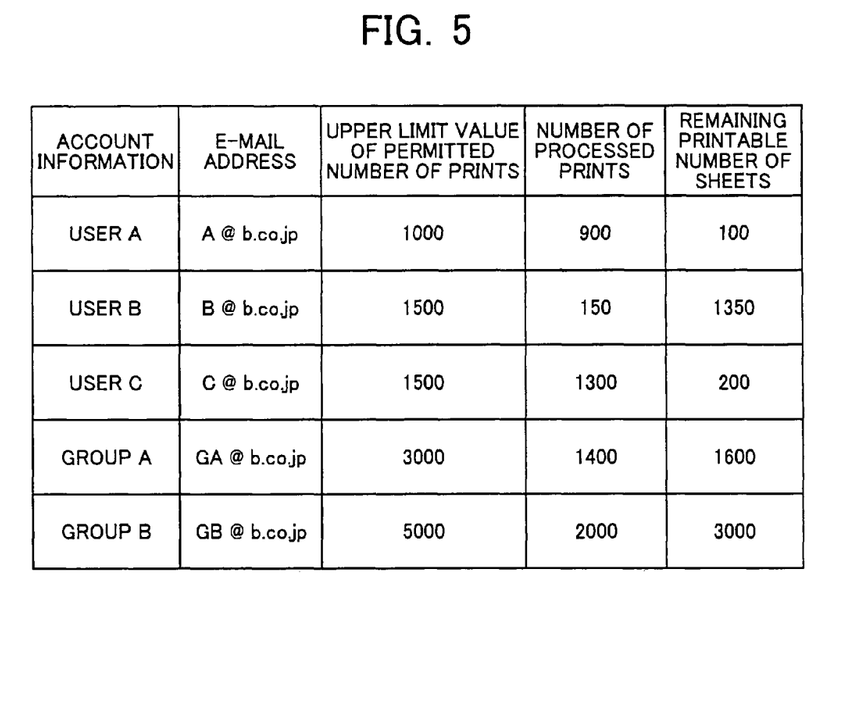
FIG. 5 is an explanatory view of an example of a print number management table used in the present invention.

FIG. 5 is an explanatory view of an example of the print number management table, which manages an e-mail address used for various notifications to the user, etc., the initially set upper limit value of permitted number of prints, the current number of processed prints, the remaining printable number of sheets for later use, etc., for each user (or group) unit. The print number management table stores and accumulates the number of used print sheets for each user acquired through the print jobs to sequentially update and manage the remaining printable number of sheets for each user.

The print number calculating portion 13 is a means whether a print job requested from the user falls within the permitted number of prints, i.e., that calculates the printable number of sheets, etc. The printable number of sheets is calculated by referring to the remaining number obtained by subtracting the number of already used sheets from the upper limit value of the permitted number of prints in the print number management table managed by the print number managing portion 12 and by calculating a difference from the number of prints of the requested print job. If a plurality of print jobs is reserved (or queued) by the same user, the total number of prints necessary for the plurality of print jobs is calculated to determine whether print processes can be executed for all the print jobs.

Figure 6:
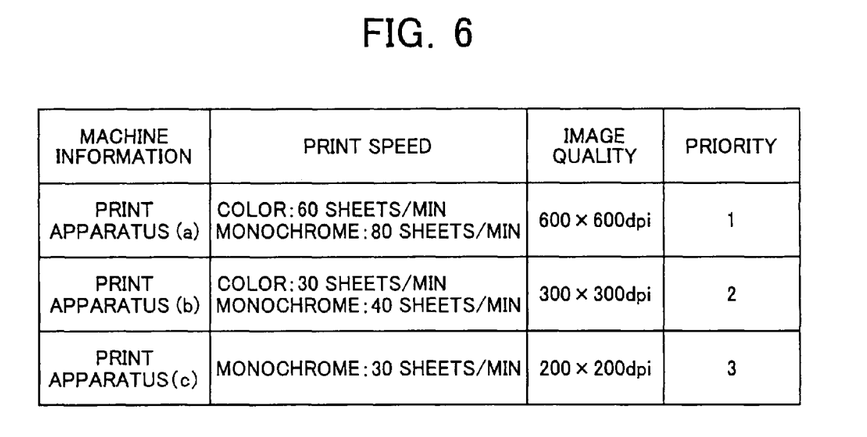
FIG. 6 is an explanatory view showing criteria for priority of print jobs used in the present invention.

The print job determining portion 14 determines that the printing cannot be performed if the print job requested by the user exceeds the remaining printable number of sheets. If a plurality of print jobs is reserved by the same user and if the total number of prints exceeds the remaining printable number of sheets, it is determined which print job is selected, provided one print job is selected. For selecting a preferential print job, for example, as shown in FIG. 6, priorities are set to a plurality of the print apparatuses in accordance with color printing, monochrome printing, print speed, image quality, etc., among the print apparatuses (a), (b), (c), etc.

In the criteria for priority, for example, when comparing a color printing job and a monochrome printing job, the color printing is considered to be more important and prioritized than the monochrome printing, and the color printing job is selected. When the color print jobs or monochrome print jobs are compared with each other, it is considered that a job set to the print apparatus having a faster print speed is more prioritized, and the print apparatus having a faster print speed is selected. If the print apparatuses have different image qualities (resolutions, etc.), a print job is selected that is set to the print apparatus having higher image quality or to a print mode with higher image quality. This selection can be set to be automatically executed.

The print job instructing portion 15 instructs each print apparatus to execute the print process or that the print process cannot be executed based on the determination result of the print job determining portion 14.

The print job confirming portion 16 is a means that acquires confirmation from the user whether the selected print job may be executed after determining and selecting the preferential print job as above. The confirmation can be performed through automatic transmission using the e-mail addresses in the management table of FIG. 5, for example. If the user responds with OK within a predetermined time period, the corresponding print apparatus is instructed to execute the print process of the print job selected by the determination. If no response can be acquired within a predetermined time period, the corresponding print apparatus is instructed to execute the print process of the print job selected by the determination.

On the other hand, the user may respond with NO to the determination result of the print job. For example, the monochrome printing may be desirable on grounds of budget since printing costs are considerably different between the color printing and monochrome printing. In such a case, a different print job is selected and the corresponding print apparatus is instructed to execute the print process regardless of the determination of the print job determining portion 14. Alternatively, when confirming the print job, all the reserved print jobs can be canceled to issue a new job that satisfies the printable number of sheets. Even in such a case, if no response is received within a predetermined time period, the corresponding print apparatus is instructed to execute the print process of the print job selected by the determination.

Figure 3:
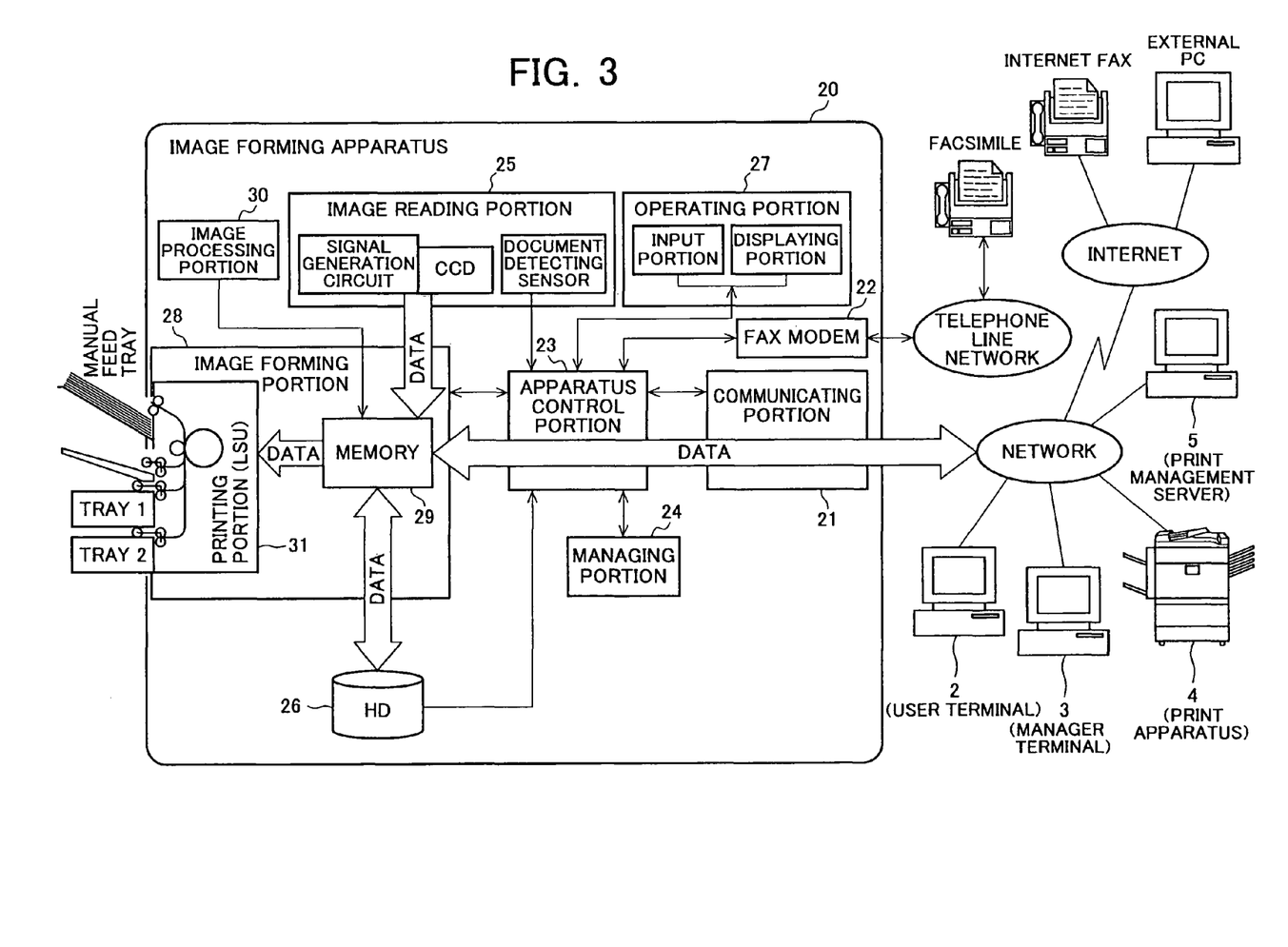
FIG. 3 is an explanatory view of an example of a print apparatus (image forming apparatus) used in the present invention.

FIG. 3 depicts an example of the above print apparatus 4 and is an explanatory view of an example of application to an image forming apparatus (e.g., digital multi-function peripheral) including a plurality of functions of a copying apparatus, a print apparatus, a facsimile apparatus, and scanner apparatus, for example.

A digital multi-function peripheral (hereinafter, multi-function peripheral) 20 is shown as an example of the image forming apparatus and is connected at a communicating portion 21 through a communication network such as in-house LAN to the user terminal 2 and another print apparatus 4 to enable mutual exchange of information. The multi-function peripheral 20 is also connected to a wide-area communication network such as the internet to transmit and receive information to and from external devices such as internet FAX or external PC. The multi-function peripheral 20 can use a FAX modem 22 to communicate with other facsimile apparatuses through a telephone line network.

The multi-function peripheral 20 includes a CPU executing arithmetic processing and an apparatus control portion 23 including RAM that has process information temporarily stored thereon to perform general control of devices and provided with programs, etc., for executing various functions. The apparatus control portion 23 is connected to a managing portion 24 that stores management control information (various pieces of control information) for managing processes executed by the multi-function peripheral 20 and is also connected to an image reading portion 25 that reads images, etc., recorded on a recording paper sheet to create image data. The image reading portion 25 includes a scanner (such as CCD) for capturing image data on a document and a document detecting sensor that detects whether a document exists. The apparatus control portion 23 is also connected to a hard disk apparatus (HD) 26, and HD 26 can store and retain data related to image processes such as image data generated by the image reading portion 25.

The apparatus control portion 23 is also connected to an operating portion 27 used by the user for inputting. The operating portion 27 includes an input portion such as a touch panel and a numeric keypad for inputting information such as control instructions, and a displaying portion such as a liquid crystal display that displays information for operation. The operating portion 27 is also used for inputting authentication codes that authenticate the manager and users of the multi-function peripheral 20.

An image forming portion 28 temporarily stores the read image data into a memory 29, and an image processing portion 30 reads the image data stored in the memory 29 to detect and apply shading correction and particular images. The image forming portion 28 includes a printing portion 31 that forms and prints an image on a recording paper sheet. Therefore, the multi-function peripheral 20 functions as a copier that forms an image with the printing portion 31 after storing the image data generated by the image reading portion 25 into the memory 29. Since the image data created by the image forming portion 28 can be transmitted to the outside and the external image data can be received with the image forming portion 28 to form an image, the multi-function peripheral 20 also functions as a print apparatus.

Figure 4A:
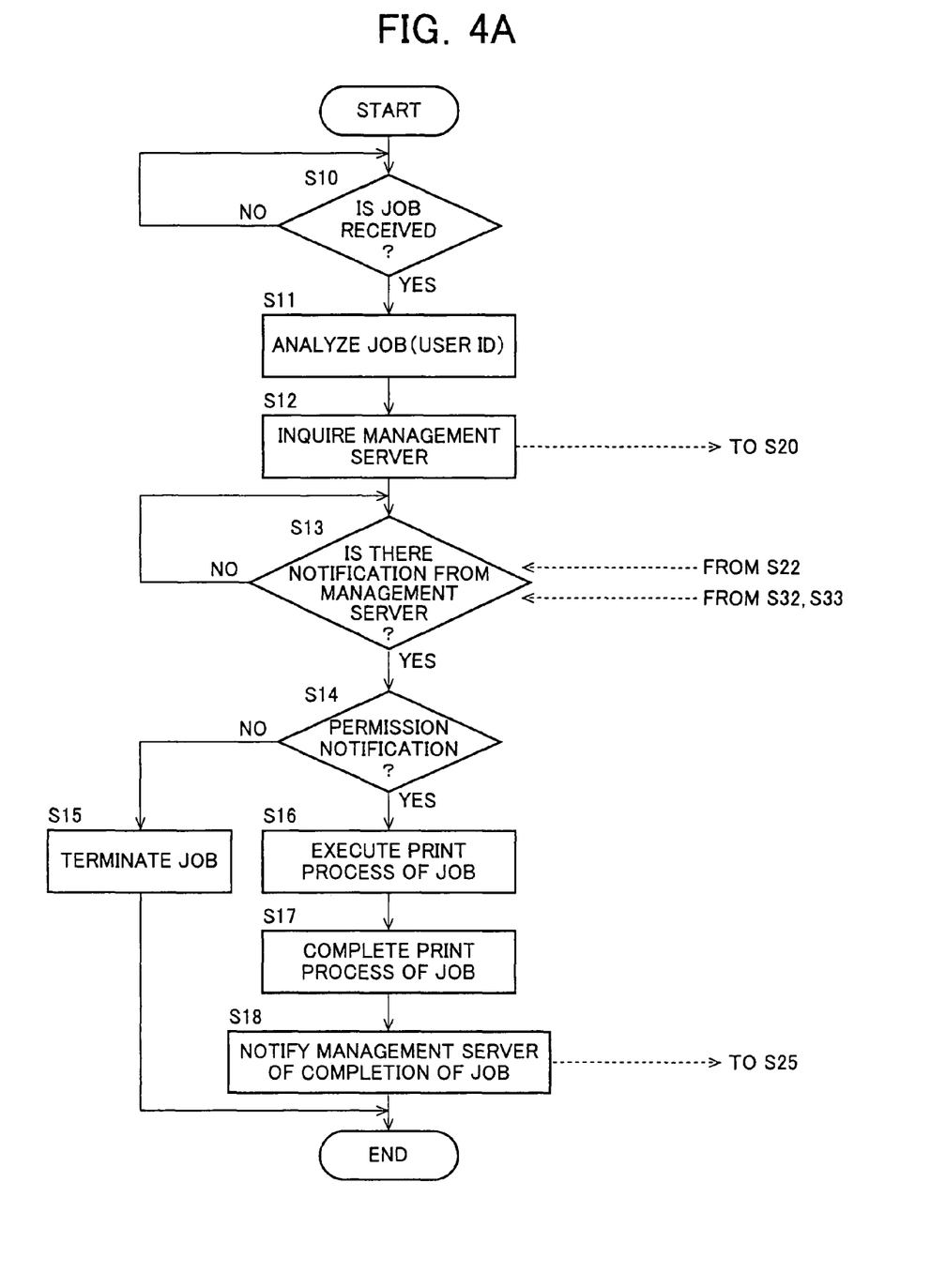
FIG. 4A is an explanatory view of a flow example of the print apparatus in the printing system of the present invention.
Figure 4B:
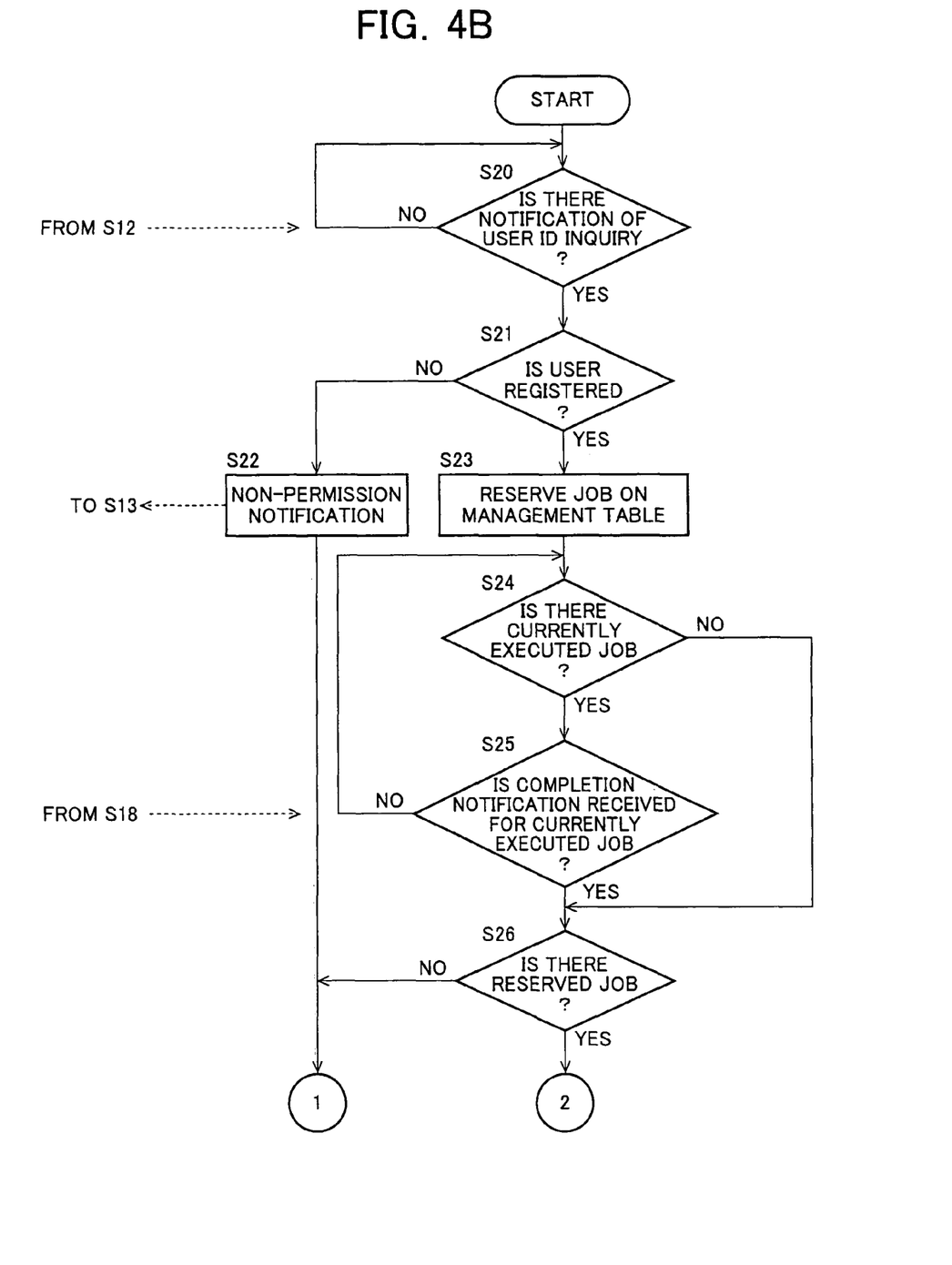
FIG. 4B is an explanatory view of a flow example of the management server in the printing system of the present invention.

FIGS. 4A to 4c are views showing an example of a flow of the printing system according to the present invention. An outline of the operation of the system will be described with reference to this flowchart. In the flow of the print apparatus (image forming apparatus) of FIG. 4A, for example, it is assumed that a print apparatus (a) receives a print job (hereinafter, simply a job) from a user C through a user terminal (C) at step S10 (Yes at step S10). The print apparatus (a) analyzes contents of the received job (user ID, distinction between color and monochrome, print paper sheet, number of prints, etc.) at step S11 and makes an inquiry to the print management server (hereinafter, simply the management server) to check whether the job can be executed, including confirmation of the user ID at step S12 (go to step S20 of FIG. 4B).

At step S13, a standby state is maintained while waiting for a response from the management sever. If a response is sent from the management sever and if a print process cannot be executed in accordance with the job contents from the user at step S14 (No at step S14) (step S22 of FIG. 4B), the flow goes to step S15 and the job is canceled and terminated. The management server notifies the user that the job is not permitted through the flow of the management server described later. If the execution of the print process is permitted (Yes at step S14) (from steps S32 or S33 of FIG. 4C), the flow goes to step S16 to execute the print process of the job. Once the print process of the job is completed at next step S17, the flow goes to step S18 to notify the management server of the completion of the job and the flow is terminated.

The flow of the management server of FIGS. 4B and 4C will be described. As shown in FIG. 4B, if an inquiry is made for the user ID, etc., to the management server at above step S12 of the print apparatus (Yes at step S20), it is determined at next step S21 whether the user has been registered. If the user C requesting the printing has not been registered in the user management table of the management server (No at step S21), the print apparatuses in the standby state or executing other jobs are notified that the print process of the job cannot be executed at step S22 (to step S13 of FIG. 4A). This notification is also sent to the user C through the user terminal (C) at the same time.

Figure 7:
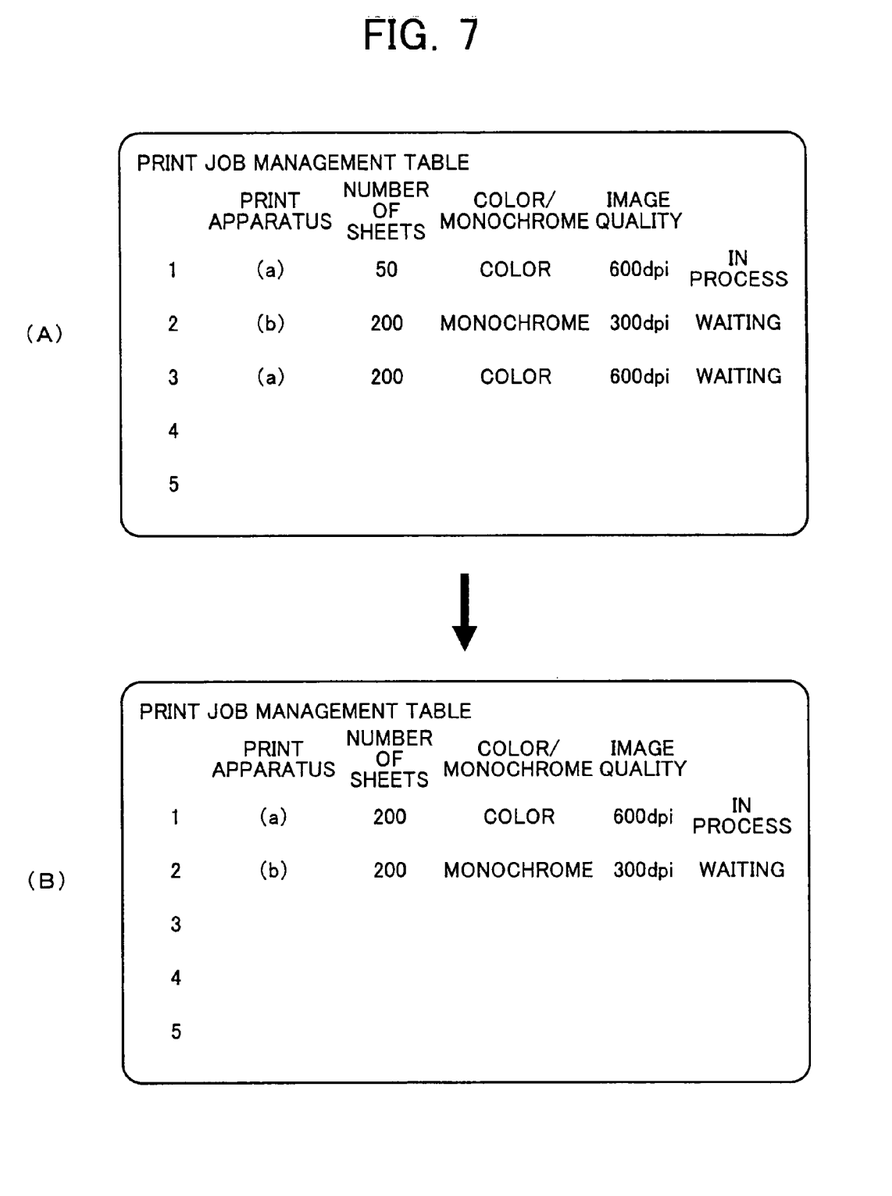
FIG. 7 is an explanatory view of an example of a print job management table used in the present invention.

If the user registration is confirmed at step S21 (Yes at step S21), the flow goes to step S23 and the job is reserved in the management server. The management server includes the print job management table shown in FIG. 7 for each user, for example, and the currently executed job and queued jobs are sequentially arranged for the same user unit. The management items of the print job management table include a device name of the print apparatus performing the printing, the number of prints, distinction between color and monochrome, and image quality, for example. FIG. 7A shows that the user C currently requests three jobs and that a print process is already permitted and currently executed for a first job 1.

At next step S24, it is determined whether a preceding job is currently executed, and if the job is currently executed (Yes at step S24), the flow goes to next step S25, and it is determined whether the completion notification of the currently executed job is received. If the currently executed job 1 is not completed (No at step S25), the flow goes back to step S24 and goes to step S25 repeatedly. The completion of the currently executed job 1 is identified by receiving the job completion notification from the print apparatus (from step S18 of FIG. 4A).

If the completion notification of the job 1 is received from the print apparatus (Yes at step S25), the flow goes to step S26. If no job is currently executed at step S24 (No at step S24), the flow also goes to step S26. After the currently executed job is completed, it is determined at step S26 whether a reserved job exists. If the queued jobs 2 and 3 exist as illustrated in FIG. 7A (Yes at step S26), the flow is shifted to the next flow shown in FIG. 4C and goes to step S27, and if no queued job exists (No at step S26), the flow is terminated.

With regard to the management of the number of prints, as described in FIG. 5, the upper limit value of permitted number of prints is set in the print number management table for each user (or group) unit, and the management is performed such that the current number of processed prints is sequentially updated. The remaining printable number of sheets within the range of the permitted number of prints is calculated from the print number management table. For example, with regard to the user C, since the permitted number of prints is 1500 and the print process is already executed for 1300 sheets at this point, the number of remaining sheets used for the printing (the remaining printable number of sheets) is 200.

With reference to the flow of FIG. 4C again, at step S27, it is checked whether the number of prints reserved by the same user exceeds the above remainder of the printable number of sheets (the remaining printable number of sheets) before the next job is executed. If only one job is reserved, it is determined whether one job is within the range of the remaining printable number of sheets, and if a plurality of jobs is reserved, the determination is performed based on the total number of prints of the plurality of reserved jobs. If the total number of prints of the reserved jobs is within the range of the remaining printable number of sheets (No at step S27), the flow goes to next step S28 to perform a normal process to execute the print processes of the jobs 2 and 3 in the order of reception, and goes to step S30.

Figure 4C:
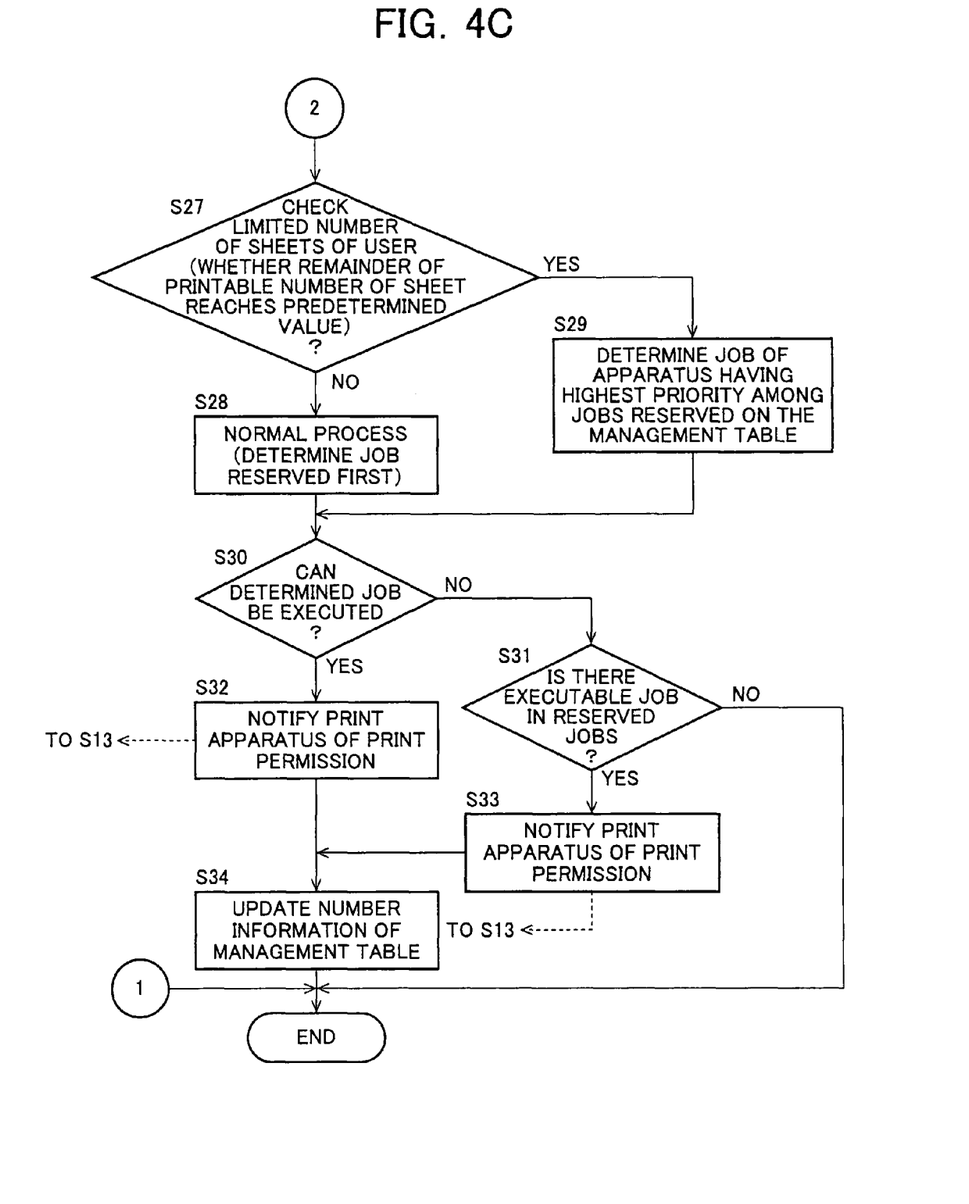
FIG. 4C is an explanatory view of a flow example continued from FIG. 4B.

If the total number of prints of the reserved jobs exceeds the range of the remaining printable number of sheets (Yes at step S27), the flow goes to step S29. With regard to the determination at step S27, for example, in the case of the user C, as shown in FIG. 7A, it is assumed that the job 2 requests 200 sheets of monochrome printing at 300 dpi in the print apparatus (b) and that the job 3 requests 200 sheets of color printing at 600 dpi in the print apparatus (a).

Since the total number of prints of the jobs 2 and 3 is 400 and the remaining printable number of sheets of the user C is 200 in accordance with the print number management table of FIG. 5, the total number goes over by 200 sheets. That is, although either job is within the range of the remaining printable number of sheets, both jobs cannot be printed.

At step S29, it is determined which one is prioritized between the queued jobs 2 and 3 reserved in the print job management table of FIG. 7A. This determination is performed by the print job determining portion 14, which is a print job determining means, as shown in FIG. 2. When determining the prioritized job, for example, criteria for priority shown in FIG. 6 can be used.

At step S29, it is assumed that the queued jobs 2 and 3 are determined and selected to be interchanged to preferentially perform a print process for the 200 sheets of color printing by interchanging based on the above criteria, for example, as shown in FIG. 7B. At step S30, it is determined whether the job determined to be preferentially processed printing may be executed. In an example of this determination, an e-mail, etc., are automatically transmitted through the communication network to the user to deliver a message such as "since a requested job exceeds the permitted number of prints, a print process is preferentially executed for 200 sheets of color printing, and permission is not given to 200 sheets of monochrome printing. Is this OK?".

If the user responds with OK, step S30 is (Yes) and the print apparatus (a) on standby for printing is notified of a print permission at step S32. When receiving this notification (step S13 of FIG. 4A), the print apparatus (a) executes a print process in accordance with the flow from step S14.

On the other hand, the user may respond with NO to the above determination result. Since the costs are considerably different between the color printing and monochrome printing, the user may select to perform monochrome printing of 200 sheets of the job 2 instead of the color printing of the job 3 selected as a result of the determination at step S29 on grounds of budget. In this case, step S30 is (No), and since an executable job (monochrome printing of the job 2) exists in the reserved jobs at step S31 (Yes at step S31), the flow goes to next step S33 to notify the print apparatus (b) on standby for printing of a print permission.

When receiving this notification (step S13 of FIG. 4A), the print apparatus (b) executes a print process in accordance with the flow from step S14. When the user is notified of the above determination result, the user may cancel both jobs and issue a new job satisfying the printable number of sheets. In such a case, step S31 is (No), and the flow can be terminated.

At the time of the determination at step S30, the user may not use the management server to respond to the notification because the user is not present or has something else to do. In this case, if no response can be acquired within a predetermined time period, the automatically selected print apparatus is instructed to execute the print process in the order of jobs automatically determined in accordance with the criteria for priority.

Steps S30 and S31 are not necessary steps and can be omitted. That is, after completing the job 1 in the state of FIG. 7A, it is determined at step S27 that both jobs 2 and 3 cannot be performed because of the remaining printable number of sheets of the same user C, and the jobs 2 and 3 are interchanged in the order as shown in FIG. 7B at step S29 to automatically select the print process of the job 3. Subsequently, the flow directly goes to step S32 to notify the print apparatus (a) of the print permission, and the print number management table of FIG. 5 and the print job management table of FIG. 7 are updated at step S34 to terminate the flow.

According to the present invention, the following effects can be achieved.

According to the present invention, if the upper limit value of the permitted number of prints is set, when a print request exceeding the upper limit value is issued as a plurality of print jobs, a print job considered as a higher function is automatically prioritized to perform the printing. As a result, a print job can tentatively be processed and stagnation of the print process can be avoided.

The invention claimed is:

1. A printing system comprising a user terminal, a print apparatus, and a management server connected to a network, the printing system having set thereon an upper limit value of permitted number of prints for each user, the management server including:

a print number calculating portion that calculates the printable number of sheets from the remainder of the permitted number of prints of a user who requested a print job and the total number of prints necessary for a plurality of unexecuted print job requests that are reserved by the same user; and a print job determining portion that automatically determines a prioritized print job from among the plurality of unexecuted print job requests within the printable number of sheets if the printable number of sheets is insufficient, such that the prioritized print job never exceeds the printable number of sheets for the user.

2. The printing system as defined in claim 1, wherein if the plurality of print jobs is a color printing job and a monochrome printing job, the color printing job is determined to be prioritized.

3. The printing system as defined in claim 1, wherein if the plurality of print jobs is a high-speed printing job and a normal-speed printing job, the high-speed printing job is determined to be prioritized.

4. The printing system as defined in claim 1, wherein if the plurality of print jobs is a high-quality printing job and a normal-quality printing job, the high-quality printing job is determined to be prioritized.

5. The printing system as defined in claim 1, comprising a print job confirming portion that acquires confirmation of the determination result of the prioritized print determining portion from the user.

6. A printing method comprising a user terminal, a print apparatus, and a management server connected to a network, the printing method having set thereon an upper limit value of printable number of sheets for each user, comprising the steps of:

calculating the printable number of sheets from the remainder of the permitted number of prints of a user who requested a print job using a print job calculating portion and the total number of prints necessary for a plurality of unexecuted print job requests that are reserved by the same user; and automatically determining a prioritized print job from among the plurality of unexecuted print job requests within the printable number of sheets to perform printing if the printable number of sheets is insufficient, such that the prioritized print job never exceeds the permitted printable number of prints sheets for the user.

\* \* \* \* \*